UNITED STATES PATENT OFFICE.

MAX ENGELMANN, OF ELBERFELD, GERMANY, ASSIGNOR TO FARBENFABRIKEN OF ELBERFELD CO., OF NEW YORK, N. Y., A CORPORATION OF NEW YORK.

PROCESS OF MAKING THE MONOFORMYL DERIVATIVE OF 1-3 DIMETHYL 4-5 DIAMIDO 2-6 DIOXYPYRIMIDIN.

SPECIFICATION forming part of Letters Patent No. 740,636, dated October 6, 1903.

Application filed July 10, 1903. Serial No. 165,001. (No specimens.)

*To all whom it may concern:*

Be it known that I, MAX ENGELMANN, doctor of philosophy, chemist, residing at Elberfeld, Germany, (assignor to the FARBENFABRIKEN OF ELBERFELD CO., of New York,) have invented a new and useful Improvement in Processes of Making the Monoformyl Derivative of 1-3-Dimethyl-4-5-Diamido-2-6-Dioxypyrimidin; and I do hereby declare the following to be an exact and clear description of my invention.

I have found that the monoformyl derivatives of 4-5-diamido-2-6-dioxypyrimidin and of 3-methyl-4-5-diamido-2-6-dioxypyrimidin having the formulæ:

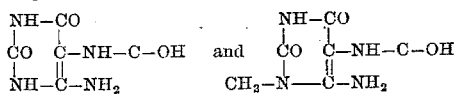

which are described in *Berichte der Deutschen Chemischen Gesellschaft*, Vol. 33, pages 3044 and 3049, can be transformed into the monoformyl derivative of 1-3-dimethyl-4-5-diamido-2-6-dioxypyrimidin of the formula:

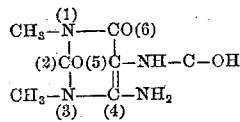

by the action of methylating agents, such as methyl iodid and alkali or the like. The reaction takes place at the ordinary temperature. An excess of alkali is to be avoided, because the resulting pyrimidin derivative can be converted into theophyllin by the further action of an alkali, as is shown in the United States Letters Patent No. 716,994, dated December 30, 1902.

The following examples will serve to illustrate the manner in which my invention can be carried into practical effect.

Example 1: A solution prepared from eighty-five grams of monoformyl-diamidodioxypyrimidin, ten hundred and fifty cubic centimeters of normal caustic-soda lye, and three hundred cubic centimeters of water is brought into reaction with one hundred and sixty grams of methyl iodid at about from 30° to 40° centigrade while continuously stirring. During the reaction the dimethyl derivative partly separates from the liquid. When the reaction is completed, the liquid is acidulated with acetic acid, and the resulting mixture is evaporated to dryness. From the raw material thus obtained the monoformyl derivative of 1-3-dimethyl-4-5-diamido-2-6-dioxypyrimidin is obtained in a pure state by a recrystallization from boiling water.

Example 2: In an autoclave a solution of ninety-two grams of the monoformyl derivative of 3-methyl-2-6-dioxy-4-5-diamidopyrimidin in five hundred and forty cubic centimeters of normal caustic-soda lye is gently heated with twenty-six grams of methyl chlorid while stirring. After about twenty-four hours the reaction is finished. The dimethyl derivative thus obtained is filtered off and purified by a recrystallization from boiling water.

The process proceeds in an analogous manner if instead of methyl iodid or methyl chlorid other methylating agents are used.

Having now described my invention and in what manner the same is to be performed, what I claim as new, and desire to secure by Letters Patent, is—

1. The process for the production of the monoformyl derivative of 1:3-dimethyl-4-5-diamido-2-6-dioxypyrimidin, which process consists in first treating the monoformyl derivative of 4-5-diamido-2-6-dioxypyrimidin with methylating agents and then isolating the resulting dimethyl compound from the reaction mass, substantially as hereinbefore described.

2. The process for the production of the monoformyl derivative of 1-3-dimethyl-4-5-diamido-2-6-dioxypyrimidin, which process consists in first treating the monoformyl derivative of 3-methyl-4-5-diamido-2-6-dioxypyrimidin with methylating agents and then isolating the resulting dimethyl compound from the reaction mass, substantially as hereinbefore described.

3. The process for the production of the monoformyl derivative of 1-3-dimethyl-4-5-diamido-2-6-dioxypyrimidin, which process consists in first treating 3-methyl-4-5-diamido-2-6-dioxypyrimidin with methyl chlorid and caustic-soda lye and then isolating the resulting monoformyl derivative of 1:3-dimethyl-4-5-diamido-2-6-dioxypyrimidin from the reaction mass, substantially as hereinbefore described.

In testimony whereof I have signed my name in the presence of two subscribing witnesses.

MAX ENGELMANN.

Witnesses:
OTTO KÖNIG,
J. A. RITTERSHAUS.